United States Patent
Yaguchi

(10) Patent No.: US 6,980,584 B1
(45) Date of Patent: Dec. 27, 2005

(54) RECEPTION APPARATUS

(75) Inventor: Tatsuya Yaguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/323,020

(22) Filed: Jun. 1, 1999

(30) Foreign Application Priority Data

Jun. 2, 1998 (JP) .......................................... 10-167781
Sep. 17, 1998 (JP) .......................................... 10-280456

(51) Int. Cl.$^7$ .......................... H04B 1/69; H04B 1/707; H04B 1/713

(52) U.S. Cl. .................. 375/148; 375/152; 375/227; 375/340

(58) Field of Search .............................. 375/148, 267, 375/331, 147, 152, 316, 354, 260, 340, 227; 370/335, 465, 209; 714/795; 455/522

(56) References Cited

U.S. PATENT DOCUMENTS

| | | | |
|---|---|---|---|
| 5,199,047 A | * 3/1993 | Koch | 375/231 |
| 5,420,884 A | 5/1995 | Inoue | 375/229 |
| 5,432,794 A | 7/1995 | Yaguchi | 371/5.5 |
| 5,623,485 A | * 4/1997 | Bi | 370/209 |
| 5,724,378 A | * 3/1998 | Miki et al. | 375/148 |
| 6,070,086 A | * 5/2000 | Dobrica | 455/522 |
| 6,137,788 A | 10/2000 | Sawahashi et al. | 370/342 |
| 6,335,954 B1 | * 1/2002 | Bottomley et al. | 375/354 |
| 6,539,205 B1 | * 3/2003 | Wan et al. | 370/465 |

FOREIGN PATENT DOCUMENTS

| | | |
|---|---|---|
| GB | 2 276 064 | 9/1994 |
| JP | 03-155228 | 7/1991 |
| JP | 06-334575 | 12/1994 |
| JP | 07-058679 | 3/1995 |
| JP | 07-131395 | 5/1995 |
| JP | 09-238094 | 9/1997 |
| WO | 96/21295 | 7/1996 |
| WO | 96/42146 | 12/1996 |

OTHER PUBLICATIONS

"Rayleigh Fading Compensation Method for 16QAM MODEM in Digital Land Mobile Radio Systems", IEICE B–II, vol. J72–B–II, No. 1, pp. 7–15 (Jan. 1989).
"Channel Estimation Based On Time–Multiplexed Pilot Symbols", IEICE RCS96–70 (Aug. 1996).
Partial English translation of Japanese Office Action dated Mar. 29, 2005 concerning Japanese Patent Application No. 10-280456.

* cited by examiner

Primary Examiner—Stephen Chin
Assistant Examiner—Curtis Odom
(74) Attorney, Agent, or Firm—Fitzpatrick, Cella, Harper & Scinto

(57) ABSTRACT

A reception apparatus includes a plurality of channel estimation devices and a RAKE combiner. A reception signal is obtained in accordance with one of the channel estimation devices which estimates a channel more accurately. The reception apparatus further includes a bit error rate calculator, a CRC checker, or an error calculator for symbol decision.

16 Claims, 9 Drawing Sheets

RECEPTION APPARATUS

BACKGROUND OF THE INVENTION

1. Field of the Invention

The present invention relates to a reception apparatus.

2. Description of the Related Art

A DS-CDMA (Direct Sequence-Code Division Multiple Access) radio access scheme is known, in which a plurality of users perform communications by using the same frequency band. In the DS-CDMA radio access scheme, users are identified by using spreading codes.

In mobile communication, multiple propagation occurs due to reflection, scattering, and refraction caused by surrounding structures, trees, and the like. Incoming waves reach a reception point through propagation paths having different lengths. The amplitude and phase of each incoming wave vary depending on the position. A variation distribution can be approximated by a Rayleigh distribution when the signal arrives by way of an indirect path.

In the DS-CDMA radio access scheme, since information data is band-spread by using a high-rate spreading code, the data can be separated into paths having a propagation delay difference larger than the period of the spreading code. By adding the phases of a plurality of separated multipath signals, a diversity effect can be obtained to attain an improvement in reception characteristics.

Since the position of a mobile station varies relative to a base station, the delay profile varies accordingly. In mobile communication, therefore, a receiver needs to have the function of absorbing such variations in the respective paths and combining a plurality of multipath signals in phase. This variation speed increases with an increase in the speed of the mobile station. To perform communication under a high-speed moving state, high-precision channel estimation that can follow fading variations is required. In a DS-CDMA radio access scheme having a frame format in which pilot symbols are inserted between information symbols in predetermined cycles, several channel estimation schemes for absorbing fading variations have been proposed.

FIG. 7 shows an example of the frame format used in the DS-CDMA radio access scheme. A basic concept of a channel estimation method will be described with reference to FIG. 7.

Referring to FIG. 7, "time slot" represents cycles in which pilot symbols are inserted between data symbols. Pilot symbols are inserted between data symbols in time slot cycles Tp. One cycle Tp (one frame) consists of Np pilot symbols and Nd data symbols. Channel estimation values at pilot symbol positions are obtained by using the pilot symbols in each time slot. By combining these channel estimation values using some method, a channel estimation value at each data symbol point is obtained.

According to Sanpei, "Rayleigh Fading Compensation Method for 16QAM MODEM in Digital Land Mobile Radio Systems ", IEICE B-II, Vol.J72-B-II, No. 1, pp. 7–15 (1989-01) (reference 1), interpolation is applied to a channel estimation value obtained by a pilot symbol and a reception symbol. In addition, according to Honda and K. Jamal, "Channel Estimation based on Time-Multiplexed Pilot Symbols", IEICE RCS96-70 (1996-08) (reference 2), a channel estimation value corresponding to a data symbol is obtained by averaging processing.

FIG. 8 is a graph showing a comparison between characteristics obtained by using a primary interpolation method and averaging method as channel estimation methods. Referring to FIG. 8, the abscissa represents the maximum Doppler frequency normalized with the pilot symbol insertion cycle; and the ordinate, the average channel estimation error in decibels. As is obvious from FIG. 8, the channel estimation errors are small when the averaging method is used as a channel estimation method in an area where fading variations are small (low-speed movement environment) and the interpolation method is used as a channel estimation method in an area where fading variations are large (high-speed movement environment). As a consequence, good BER (Bit Error Rate)/FER (Frame Error Rate) characteristics can be obtained.

The above methods are typical channel estimation schemes. FIG. 9 shows the arrangement of conventional RAKE receiver using these schemes. Referring to FIG. 9, after a reception signal is de-spread by a matched filter 700, a pilot symbol is detected. A channel estimation device 701 then performs channel estimation according to reference 1 or 2. The conjugate complex number of a channel estimation value calculated in each path, and this value is multiplied by the output from the matched filter 700 by a multiplier 702, thereby performing delay compensation. The resultant data are then combined at a maximum ratio by a RAKE combiner 703. The combined signal is subjected to symbol decision in a decision device 704 and converted into a bit stream. The bit stream data obtained in this manner is de-interleaved by a de-interleaver 705. The resultant data is then Viterbi-decoded by a Viterbi decoder 706, thus reconstructing transmission data.

In a low-speed movement environment, channel estimation based on averaging is better in characteristics than channel estimation based on primary interpolation. In contrast to this, in high-speed movement environment, primary interpolation exhibits better characteristics. For this reason, good characteristics cannot be obtained throughout the entire moving speed range.

If, however, a channel estimation method is fixed in a use environment as in the prior art, a deterioration in communication quality occurs in either a low-speed movement environment or a high-speed movement environment when the use environment deviates from the expected environment. It is therefore difficult to realize high-quality communications seamlessly from indoor semi-fixed communications to high-speed mobile communications.

SUMMARY OF THE INVENTION

It is an object of the present invention to improve reception characteristics.

It is another object of the present invention to provide a reception apparatus and method which perform a plurality of channel estimations.

It is still another object to provide a reception apparatus and method in which symbol decision result errors are few.

It is still another object of the present invention to provide a reception apparatus and method in which frame errors are few.

It is still another object of the present invention to provide a reception apparatus and method in which RAKE synthesis result errors and symbol decision result errors are few.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The first embodiment of the present invention will be described first with reference to FIGS. 1 to 3.

Figure 1:
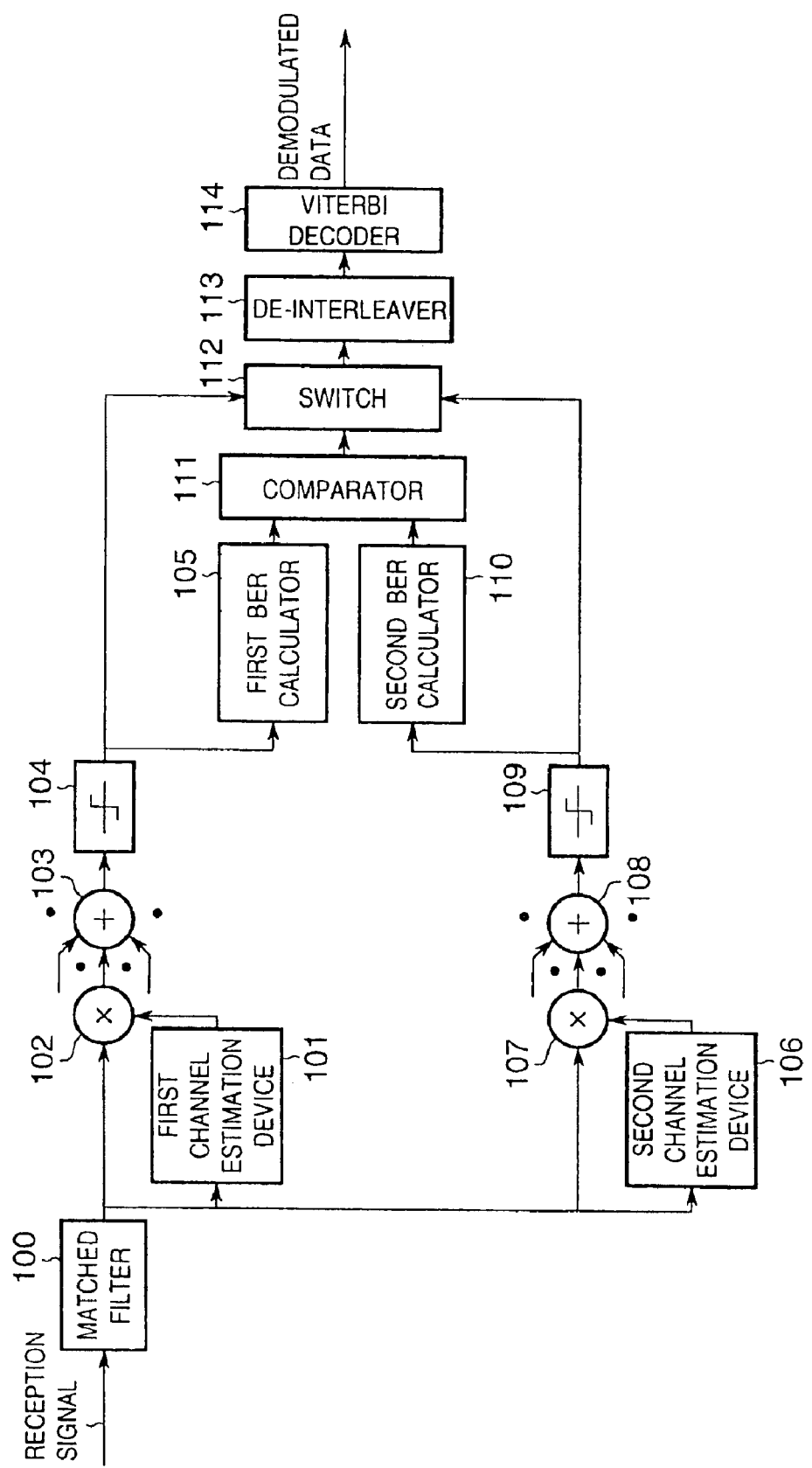
FIG. 1 is a block diagram showing the arrangement of a reception apparatus according to the first embodiment of the present invention.

FIG. 1 is a block diagram showing the arrangement of a RAKE reception apparatus according to this embodiment. Referring to FIG. 1, a reception signal is de-spread by a matched filter 100. The de-spread signal is input, in units of paths, to a first channel estimation device 101 to which a primary interpolation method is applied, and a channel estimation amount at a data symbol point is calculated. The conjugate complex number of the calculated channel estimation value is calculated. This value is multiplied by the output from the matched filter 100 by a first multiplier 102. The products obtained in units of paths are subjected to delay compensation and combined at a maximum ratio by a first RAKE combiner 103. The resultant data is converted into a bit stream by a first symbol decision device 104. A BER (Bit Error Rate) is obtained by a key input section 105 from a known pilot symbol (FIG. 7) and a decision result corresponding to the pilot symbol.

Likewise, the signal de-spread by the matched filter 100 is input, in units of paths, to a second channel estimation device 106 to which a double slot averaging method is applied, and a channel estimation amount at a data symbol point is calculated. The conjugate complex number of the calculated channel estimation value is calculated. This value is multiplied by the output from the matched filter 100 by a second multiplier 107. The products obtained in units of paths are subjected to delay compensation and combined at a maximum ratio by a second RAKE combiner 108. The resultant data is converted into a bit stream by a second symbol decision device 109. A BER (Bit Error Rate) is obtained by a second BER calculator 110 from a known pilot symbol and a decision result corresponding to the pilot symbol.

The BER obtained by the primary interpolation method and the BER obtained by the double slot averaging method are input to a comparator 111. The comparator 111 controls a switch 112 to select the output from the symbol decision device 104 or 109 which is obtained by the interpolation method with a lower BER. The output from the switch 112 is de-interleaved by a de-interleaver 113 by being rearranged on the time axis. The resultant data is Viterbi-decoded by a Viterbi decoder 114, thus reconstructing transmission data.

Figure 2:
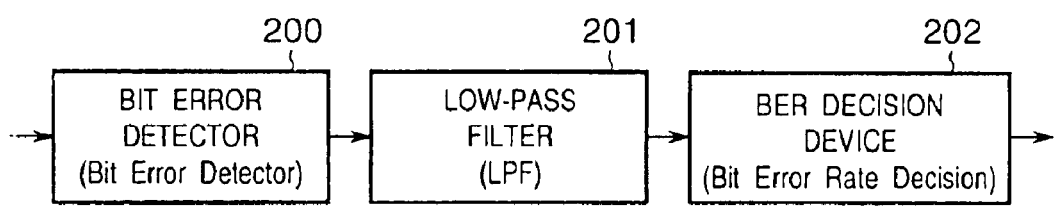
FIG. 2 is a block diagram showing the arrangement of a BER calculator in the reception apparatus according to the first embodiment of the present invention.

FIG. 2 is a block diagram showing the arrangement of a BER calculator in the reception apparatus of this embodiment. Referring to FIG. 2, reference numeral 200 denotes a bit error detector for detecting a bit error from a known pilot symbol and a decision result corresponding to the pilot symbol and outputting "1" upon detection of an error, and "0" upon detection of no error; 201, a low-pass filter (LPF) for obtaining the exponential weighted mean of the output from the bit error detector 200; and 202, a BER decision device for extracting a BER and outputting, for example, one new BER every 100 frames.

Figure 3:
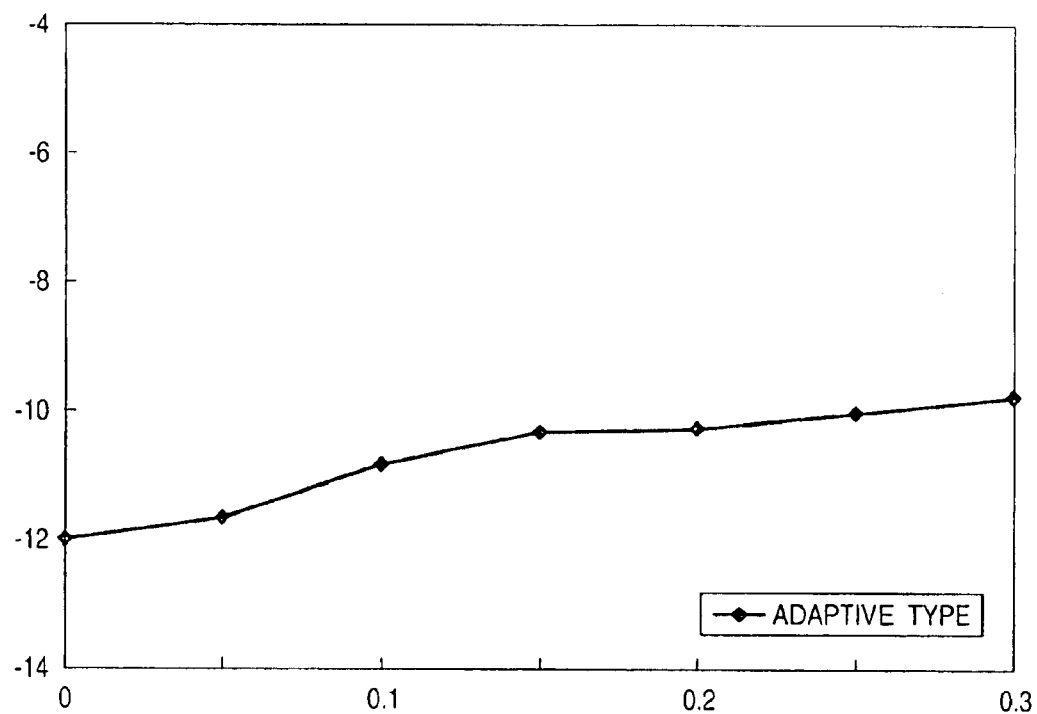
FIG. 3 is a graph showing the characteristics of the reception apparatus according to the first embodiment of the present invention.

FIG. 3 is a graph showing the characteristics of the reception apparatus according to this embodiment. Referring to FIG. 3, the abscissa indicates the maximum Doppler frequency normalized with the pilot symbol insertion cycle; and the ordinate, the average channel estimation error in decibels. As is obvious from this graph, the channel estimation method based on averaging is applied in a low-speed movement environment, and the primary interpolation method is applied in a high-speed movement environment with a maximum Doppler frequency of about 0.1 serving as a threshold. An improvement in average BER is attained as compared with the characteristics in the prior art.

The second embodiment of the present invention will be described next with reference to FIG. 4.

Figure 4:
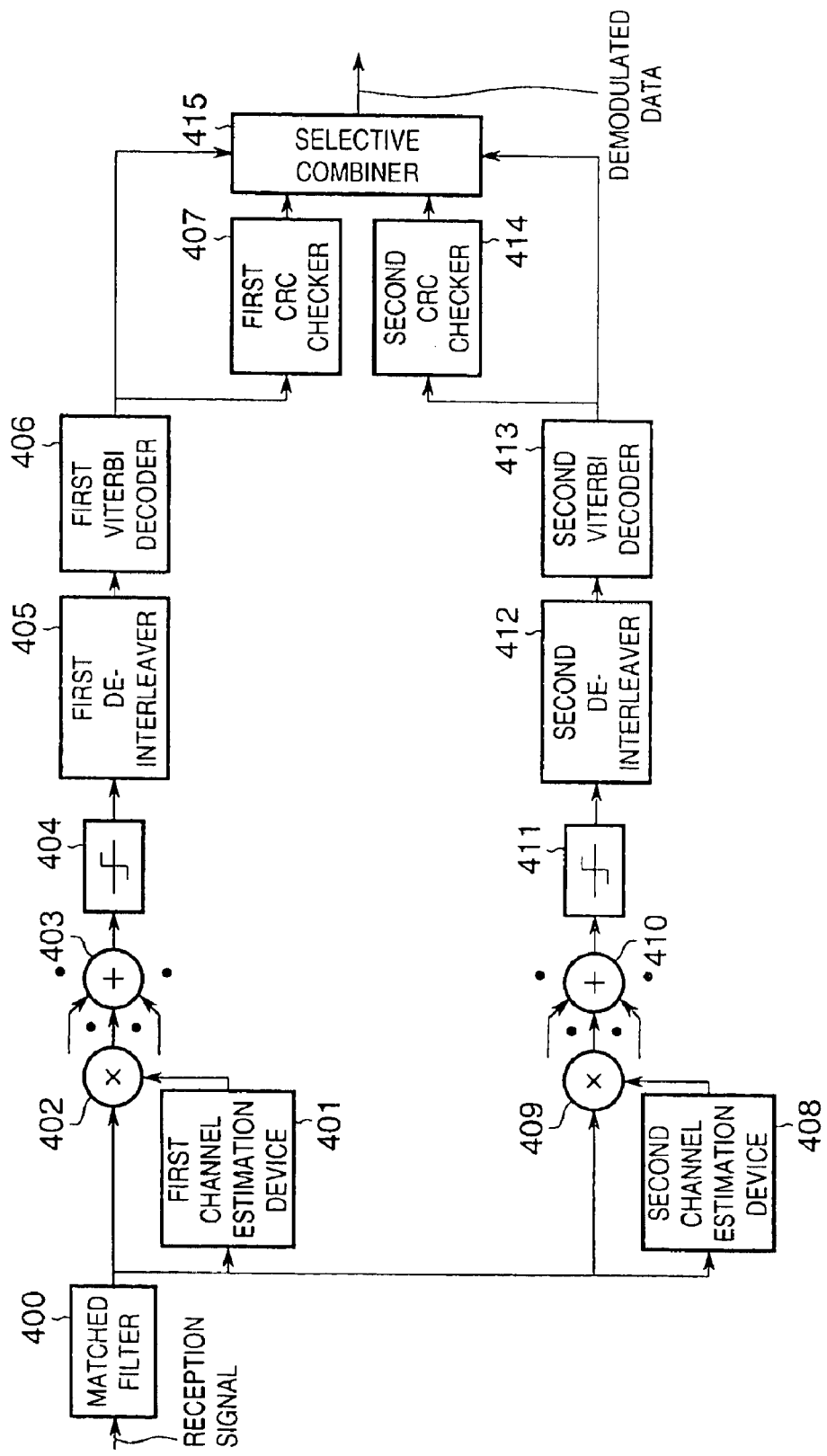
FIG. 4 is a block diagram showing the arrangement of a reception apparatus according to the second embodiment of the present invention.

FIG. 4 is a block diagram showing the arrangement of a RAKE reception apparatus according to this embodiment.

Figure 7:
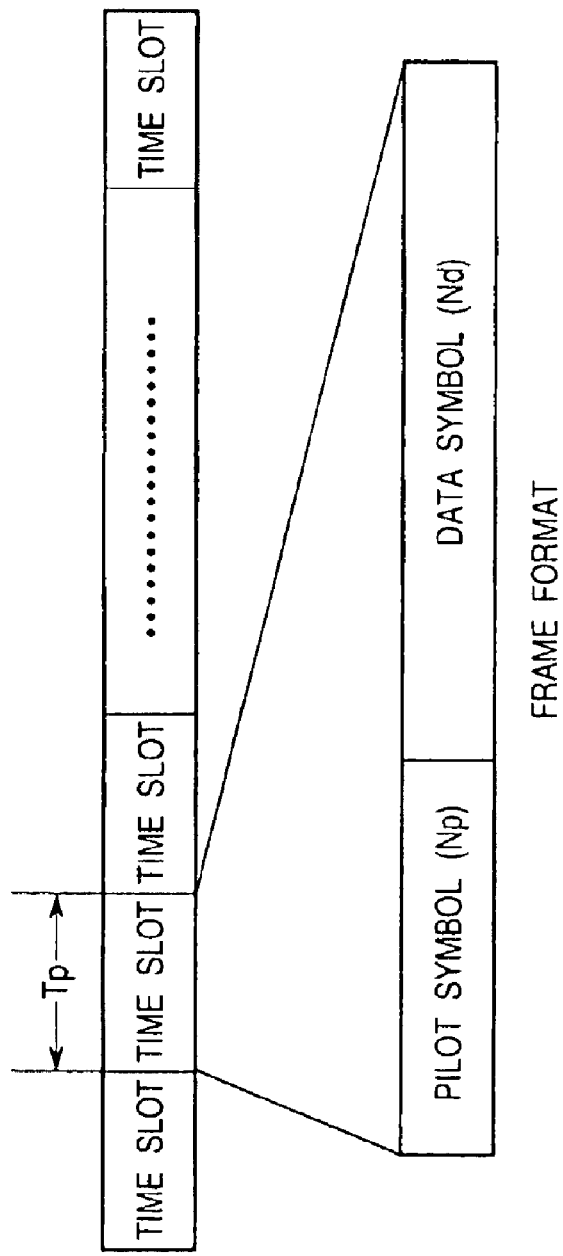
FIG. 7 is a view showing the frame format used in a DS-CDMA radio access scheme.
Figure 8:
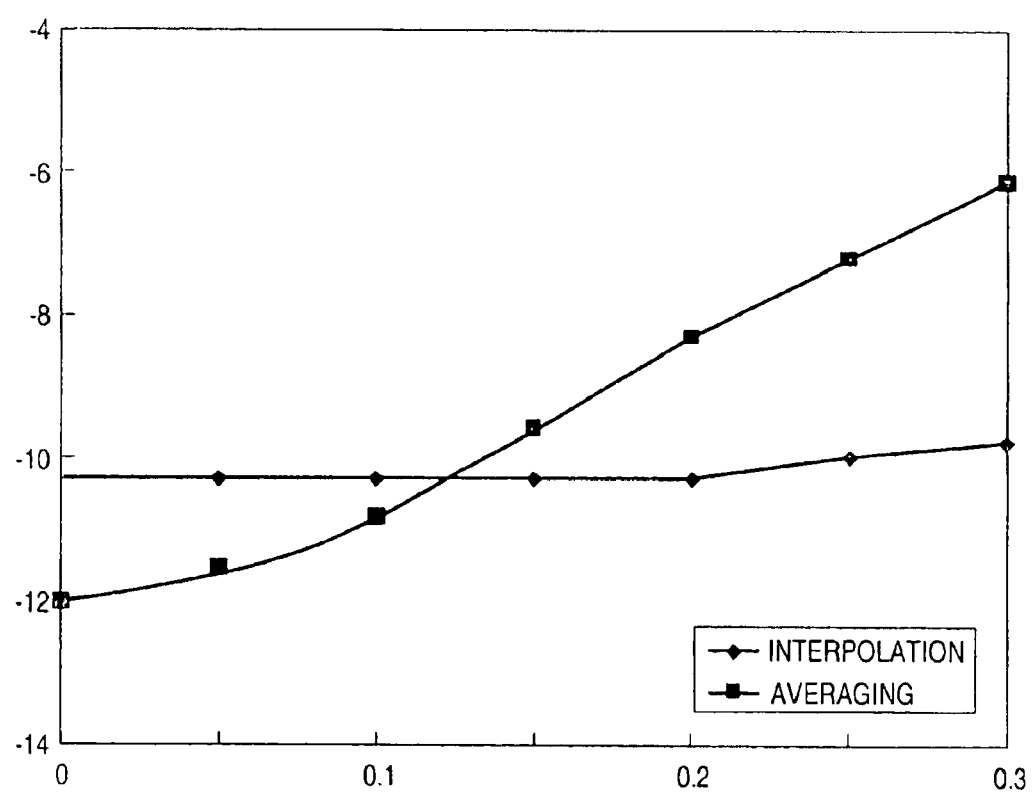
FIG. 8 is a graph showing the channel estimation error characteristics of the channel estimation method used in a conventional reception apparatus.
Figure 9:
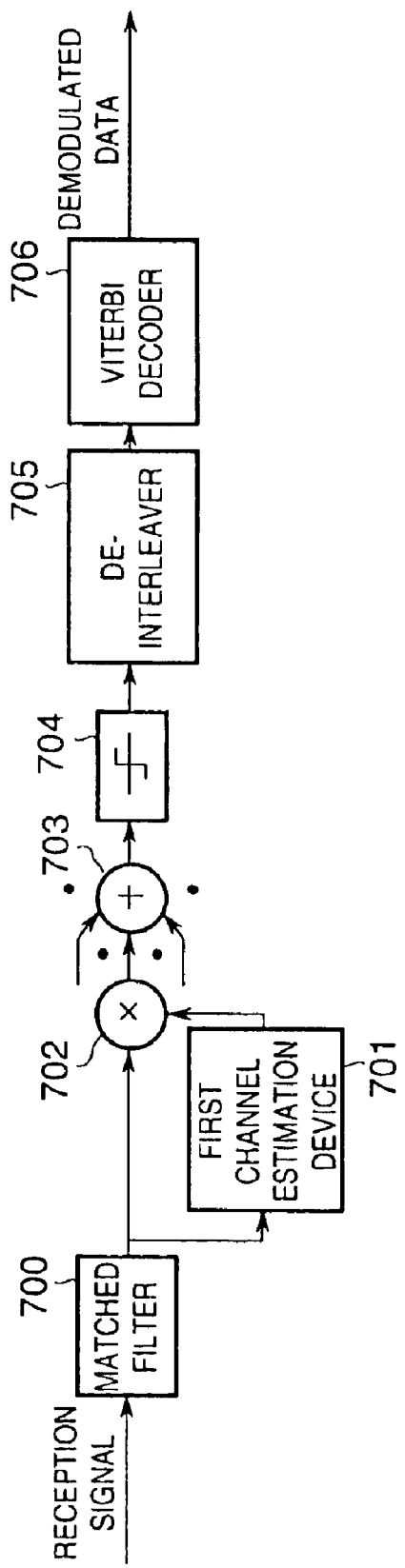
FIG. 9 is a block diagram showing the arrangement of the conventional reception apparatus.

In the reception apparatus of this embodiment, the frame format shown in FIG. 7 is used. In this embodiment, however, a CRC is added to a data symbol to be transmitted. That is, each frame consists of a pilot symbol, a data symbol, and a CRC for frame error detection.

Referring to FIG. 4, a reception signal is de-spread by a matched filter 400. The de-spread signal is input, in units of paths, to a first channel estimation device 401 to which the primary interpolation method is applied, and a channel estimation amount at a data symbol point is calculated. The conjugate complex number of the output channel estimation value is calculated. This value is multiplied by the output from the matched filter 400 by a first multiplier 402. The products obtained in units of paths are subjected to delay compensation and combined at a maximum ratio by a first RAKE combiner 403. The resultant data is converted into a bit steam by a first symbol decision device 404. The bit stream is de-interleaved by a first de-interleaver 405 in accordance with a known pilot symbol and a decision result corresponding to the pilot symbol. The resultant data is Viterbi-decoded by a first Viterbi decoder 406. The output from the first Viterbi decoder 406 is input to a first CRC checker 407. The first CRC checker 407 makes a CRC check, i.e., detects a frame error. The CRC check result obtained by the first CRC checker 407 is input to a selective combiner 415.

Similarly, the signal de-spread by the matched filter 400 is input, in units of paths, to a second channel estimation device 408 to which the double slot averaging method is applied, and a channel estimation amount at a data symbol is calculated. The conjugate complex number of the calculated channel estimation value is calculated. This value is multiplied by the output from the matched filter 400 by a second multiplier 409. The products obtained in units of paths are subjected to delay compensation and combined at a maximum ratio by a second RAKE combiner 410. The resultant data is converted into a bit stream by a second symbol decision device 411. The bit steam is de-interleaved by a second de-interleaver 412 in accordance with a known pilot symbol and a decision result corresponding to the pilot symbol. The resultant data is Viterbi-decoded by a second Viterbi decoder 413. The output from the second Viterbi decoder 413 is input to a second CRC checker 414. The second CRC checker 414 makes a CRC check, i.e., detects a frame error. The CRC check result obtained by the second CRC checker 414 is input to the selective combiner 415.

The selective combiner 415 selects one of the decoding results which exhibits no error and outputs it as demodulated data. If both the decoding results have no error, either of them is output. If both the decoding results have errors, the corresponding frame is handled as a frame loss and is not output as demodulated data.

In this embodiment, since the two decision results, i.e., the bit streams, from the first and second symbol decision devices 404 and 411 may differ from each other, two independent de-interleavers are used as the first and second de-interleavers 405 and 412.

The third embodiment of the present invention will be described first with reference to FIGS. 5 and 6.

Figure 5:
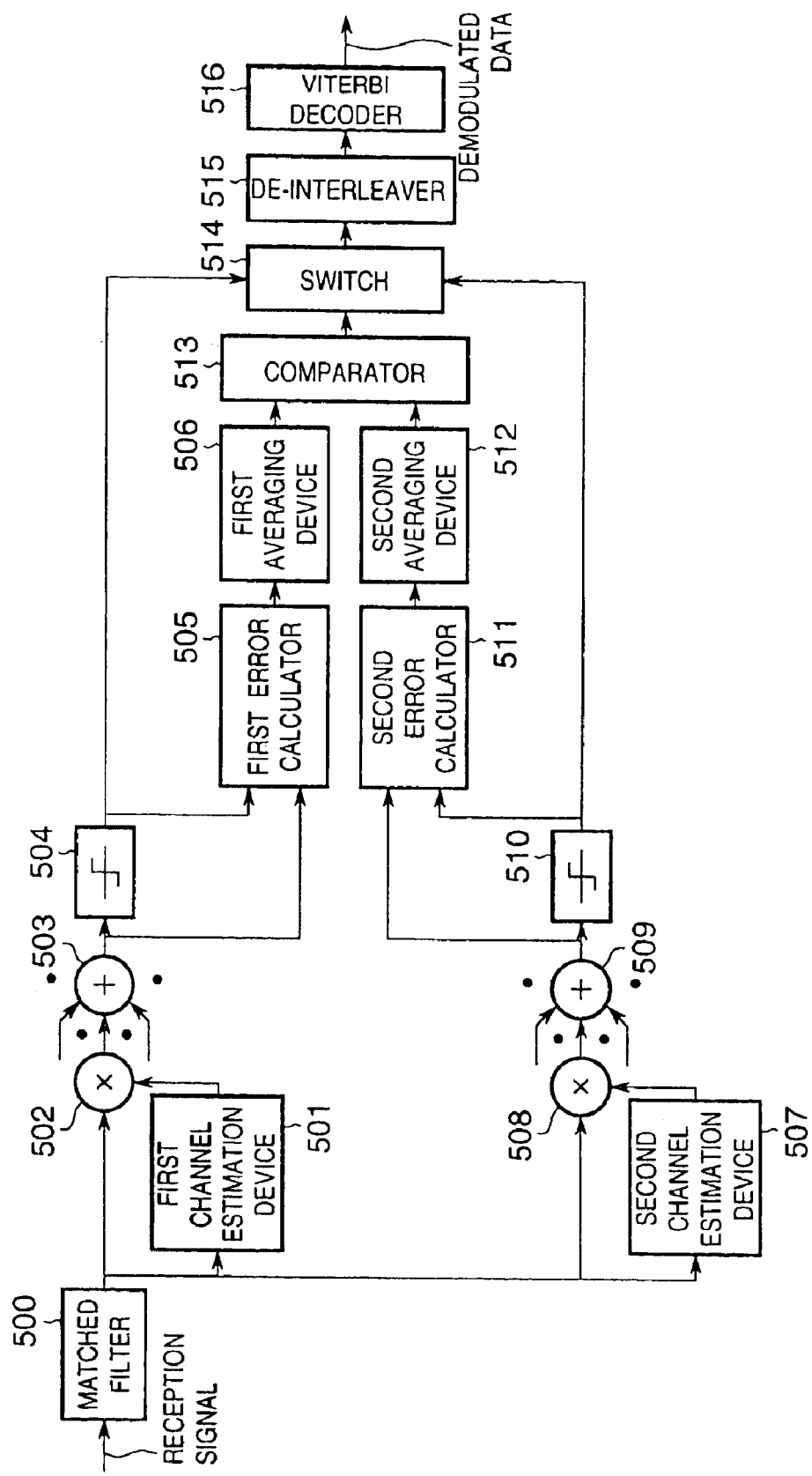
FIG. 5 is a block diagram showing the arrangement of a reception apparatus according to the third embodiment of the present invention.

FIG. 5 is a block diagram showing the arrangement of a RAKE reception apparatus according to this embodiment. Referring to FIG. 5, a reception signal is de-spread by a matched filter 500. The de-spread signal is input, in units of paths, to a first channel estimation device 501 to which the primary interpolation method is applied, and a channel estimation amount at a data symbol is calculated. The conjugate complex number of the calculated channel estimation value is calculated. This value is multiplied by the output from the matched filter 500 by a first multiplier 502. The products obtained in units of paths are subjected to delay compensation and combined at a maximum ratio by a first RAKE combiner 503. Symbol decision is made by a first symbol decision device 504. The output from the first RAKE combiner 503 and the decision result from the first symbol decision device 504 are input to a first error calculator 505. The first error calculator 505 calculates the absolute value of the error between the output from the first RAKE combiner 503 and the decision result from the first symbol decision device 504 or the square of the absolute value of the error, and inputs the calculated value to a first averaging device 506. The first averaging device 506 performs averaging processing for the absolute value of the error or the square of the absolute value of the error by using a means such as an LPF (low-pass filter) or moving averaging mean.

Likewise, the signal de-spread by the matched filter 500 is input, in units of paths, to a second channel estimation device 507 to which the double slot averaging method is applied; and a channel estimation amount at a data symbol is calculated. The conjugate complex number of the calculated channel estimation value is calculated. This value is multiplied by the output from the matched filter 500 by a second multiplier 508. The products obtained in units of paths are subjected to delay compensation and combined at a maximum ratio by a second RAKE combiner 509. A second symbol decision device 510 performs symbol decision. The output from the second RAKE combiner 509 and the decision result from the second symbol decision device 510 are input to a second error calculator 511. The second error calculator 511 calculates the absolute value of the error between the output from the second RAKE combiner 509 and the decision result from the second symbol decision device 510 or the square of the absolute result of the error. The calculated value is input to a second averaging device 512. The second averaging device 512 performs averaging processing for the absolute value of the error or the square of the absolute value of the error by using a means such as an LPF (low-pass filter) or moving averaging mean.

The average error obtained by the primary interpolation method and the average error obtained by double slot averaging method are input to a comparator 513. The comparator 513 controls a switch 514 so as to select one of the outputs from the symbol decision devices 504 and 510 which is obtained by a channel estimation method with a smaller average error. The output from the switch 514 is de-interleaved by a de-interleaver 515. The resultant data is Viterbi-decoded by a Viterbi decoder 516, thus reconstructing transmission data.

The first and second error calculators 505 and 511 will be described in further detail next with reference to FIG. 6.

Figure 6:
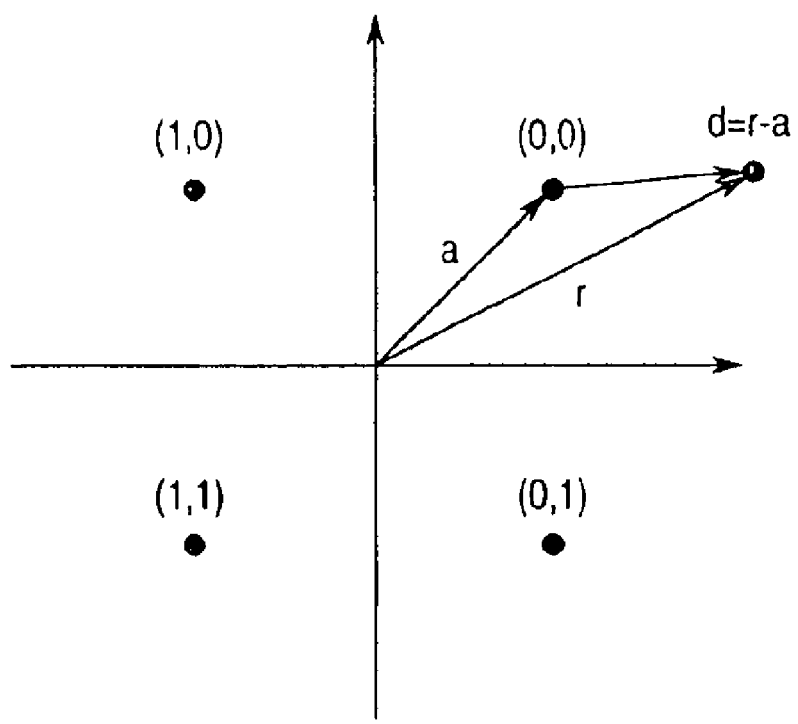
FIG. 6 is a graph showing the relationship between a reception signal vector, a transmission signal point, and an error vector in the reception apparatus according to the third embodiment of the present invention.

FIG. 6 is a graph showing the relationship between the reception signal vector as the input signal to each of the first and second error calculators 505 and 511 in the reception apparatus of this embodiment, the transmission signal point, and the error vector. Referring to FIG. 6, a vector a corresponds to a signal point when an in-phase bit as a transmission signal among QPSK signal points is "0", and the opposite-phase bit is "a". Assume that a reception signal vector r corresponding to a transmission point a is output from each of the first and second RAKE combiners 503 and 509. An error vector d is calculated by $$d = r - a \qquad (1)$$

The first or second symbol decision device 504 or 511 calculates $|d|$ or $|d|^2$ and outputs a signal representing this calculated value.

It is taken for granted that a signal output from a RAKE combiner located closer to each signal point is statistically observed from an output from a RAKE combiner having undergone better channel estimation. A decision result output by a better channel estimation method can therefore be selected through the switch 514 by allowing the comparator 513 to compare the results obtained by performing averaging processing for the outputs from the first and second error calculators 505 and 511 using the averaging devices 506 and 512.

The same characteristics as those of the first embodiment shown in FIG. 3 can be obtained from the reception apparatus of this embodiment.

In the fourth embodiment, a comparator 513 controls a switch 514 in accordance with an average error obtained when the pilot symbols shown in FIG. 7 are received. In this embodiment, only the pilot symbols shown in FIG. 7 and RAKE combiner outputs corresponding to the pilot symbols are selectively input to an error calculator. Since a pilot signal is a known signal with respect to a reception signal, an error signal based on a transmission pilot signal and a reception pilot signal can always be calculated with high precision.

As many apparently widely different embodiments of the present invention can be made without departing from the spirit and scope thereof, it is to be understood that the invention is not limited to the specific embodiments thereof except as defined in the appended claims. That is, a method except the primary interpolation method and averaging method may be used as a channel estimation method. The number of channel estimation devices is three or more.

What is claimed is:

1. A reception apparatus comprising:
   first channel estimation means for performing channel estimation by using a first estimation method;
   second channel estimation means for performing channel estimation by using a second estimation method different from the first estimation method;
   first combining means for combining signals in accordance with a first output from said first channel estimation means;
   second combining means for combining signals in accordance with a second output from said second channel estimation means;
   detection means for detecting errors of outputs from said first and said second combining means, wherein said detection means comprises first and second decoding means for decoding respective outputs from said first and said second combining means; and
   selection means for selecting the output of one of said first and second decoding means on the basis of errors of outputs from said first and second decoding means.

2. The apparatus according to claim 1, wherein each of said first and said second channel estimation means estimates a channel from a de-spread reception signal.

3. The apparatus according to claim 1, wherein one of said first and said second channel estimation means estimates a channel by an interpolation method.

4. The apparatus according to claim 1, wherein one of said first and said second channel estimation means estimates a channel by a double slot averaging method.

5. The apparatus according to claim 1, wherein said selection means selects one of said first and said second combining means in accordance with an error detected with respect to a pilot symbol.

6. The apparatus according to claim 1, wherein said selection means selects one of said first and said second combining means in accordance with an error detected with respect to periodically received pilot symbols.

7. The apparatus according to claim 1, wherein said selection means selects one of said first and said second combining means in units of frames.

8. The apparatus according to claim 1, wherein said selection means selects one of said first and said second combining means in units of frames including frame error detection codes.

9. A reception apparatus comprising:
   first channel estimation means for performing channel estimation by using a first estimation method;
   second channel estimation means for performing channel estimation by using a second estimation method different from the first estimation method;
   first combining means for combining signals in accordance with a first output from said first channel estimation means;
   second combining means for combining signals in accordance with a second output from said second channel estimation means;
   detection means for detecting errors of output from said first and said second combining means, wherein said detection means comprises first and second decision means for performing symbol decision of respective outputs from said first and said second combining means; and
   selection means for selecting the output of one of said first and second decision means in accordance with errors based on the decisions made by said first and second decision means.

10. The apparatus according to claim 9, wherein said selection means selects one of said first and said second combining means in accordance with an average of errors based on the decision made by said decision means.

11. A reception method comprising the steps of:
    a first channel estimation step of performing channel estimation by using a first estimation method;
    a second channel estimation step of performing channel estimation by using a second estimation method different from the first estimation method;
    a first combining step of combining signals in accordance with a first result of the first channel estimation step;
    a second combining step of combining signals in accordance with a second result of the second channel estimation step;
    a detection step of detecting errors of combination results obtained in the first and the second combining steps, wherein the detection step comprises a decoding step of decoding respective combination results in the first and the second combining steps; and
    a selection step of selecting one of the respective decoding results of the first and the second combining steps on the basis of errors of the respective decoding results obtained in the decoding step.

12. The method according to claim 11, wherein the first and the second channel estimation steps comprise estimating a channel from a de-spread reception signal.

13. The method according to claim 11, wherein the selection step comprises selecting one of the first and the second combining steps in units of frames.

14. A reception method comprising the steps of:
    a first channel estimation step of performing channel estimation by using a first estimation method;
    a second channel estimation step of performing channel estimation by using a second estimation method different from the first estimation method;
    a first combining step of combining signals in accordance with a first output of the first channel estimation step;
    a second combining step of combining signals in accordance with a second output of the second channel estimation step;
    a detection step of detecting errors of combination results obtained in the first and the second combining steps, wherein the detection step comprises a decision step of performing symbol decision of respective combination results in the first and the second combining steps; and
    a selection step of selecting one of the respective symbol decision results of the first and the second combining steps in accordance with errors of the respective symbol decisions obtained in the decision step.

15. The apparatus according to claim 9, wherein one of said first and said second channel estimation means estimates a channel by an interpolation method.

16. The apparatus according to claim 9, wherein one of said first and said second channel estimation means estimates a channel by a double slot averaging method.

* * * * *